March 6, 1962 — E. M. PROSEN — 3,023,500
DENTAL ATTACHMENT AND METHOD OF MAKING THE SAME
Filed April 6, 1955 — 2 Sheets-Sheet 1
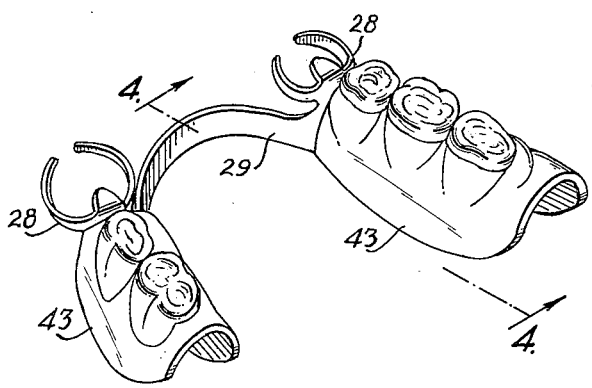
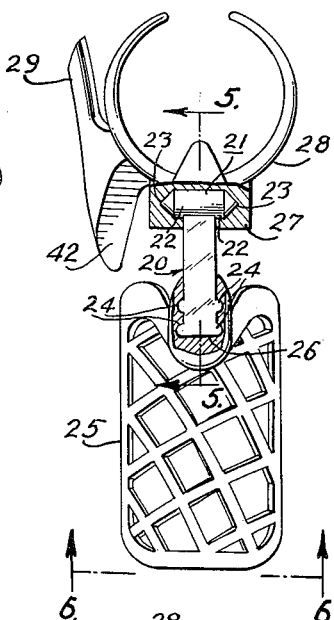
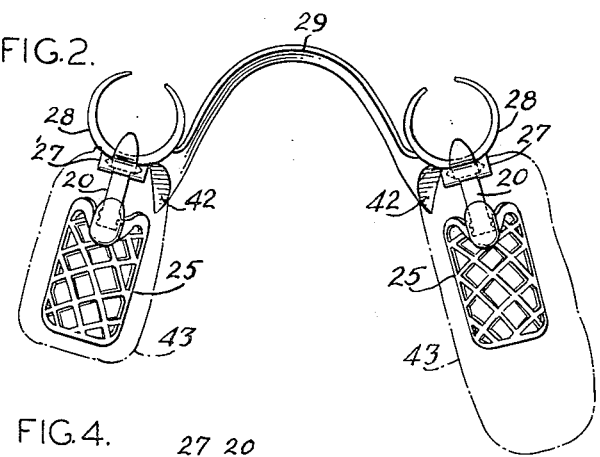
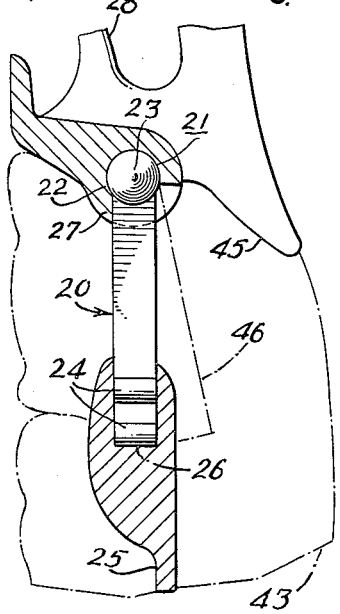
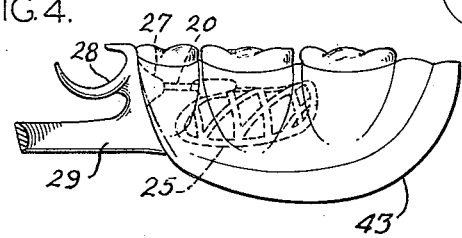
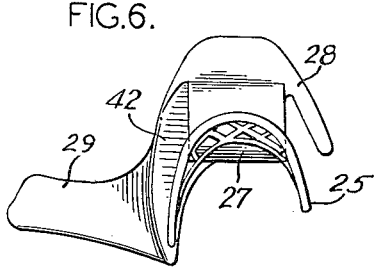
INVENTOR:
EMIL M. PROSEN
BY Howson & Howson
ATTYS.

March 6, 1962  E. M. PROSEN  3,023,500
DENTAL ATTACHMENT AND METHOD OF MAKING THE SAME
Filed April 6, 1955  2 Sheets-Sheet 2
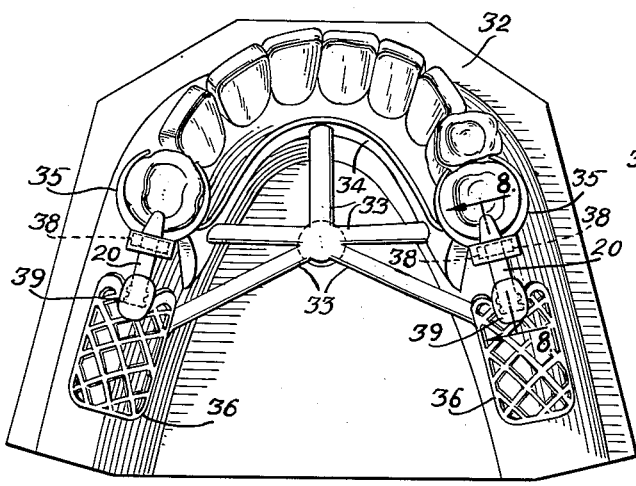
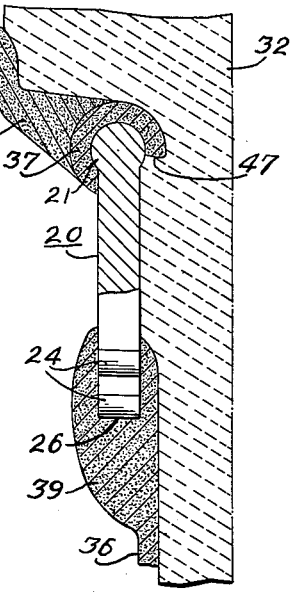
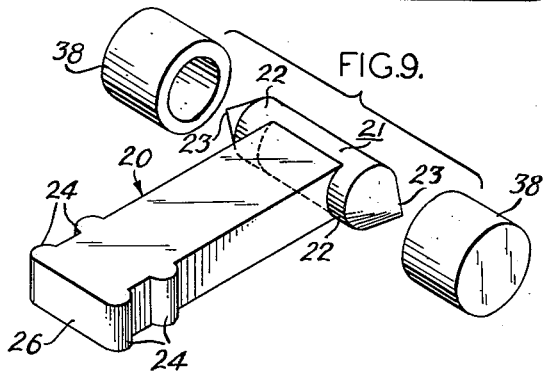
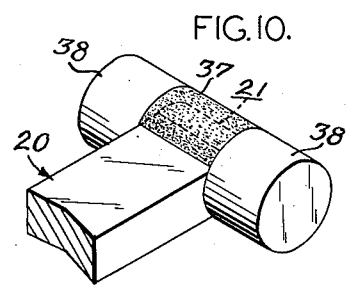
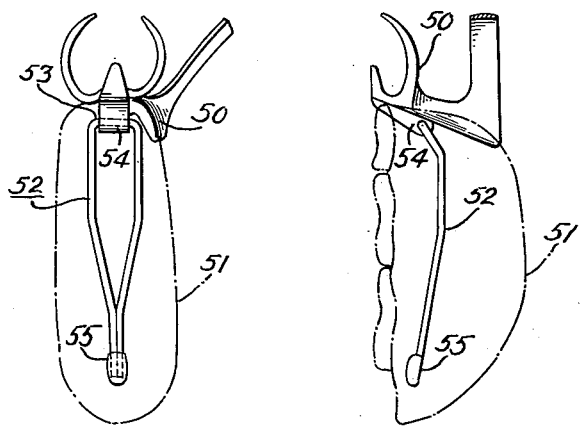
INVENTOR:
EMIL M. PROSEN
BY Howson & Howson
ATTYS.

United States Patent Office 3,023,500
Patented Mar. 6, 1962

3,023,500
DENTAL ATTACHMENT AND METHOD
OF MAKING THE SAME
Emil M. Prosen, Bala-Cynwyd, Pa., assignor to Nobilium Products, Inc., Philadelphia, Pa., a corporation of Pennsylvania
Filed Apr. 6, 1955, Ser. No. 499,622
6 Claims. (Cl. 32—5)

This invention relates to the art of partial dentures, and is concerned with improved dental attachments for the support and securement of artificial teeth, and with improvements in methods of fabricating such attachments. It is concerned especially with attachments providing a so-called stress-breaker feature, i.e., with supports in which a major part of the stress imposed in use of the partial denture for mastication of food is transmitted to the underlying gums, thereby avoiding destructive stress upon the abutment teeth or bar by which the denture is anchored within the mouth.

There have been many proposals for attainment of this result, but these have for the most part presented one or more difficulties which rendered them unsatisfactory for adoption. For example, in some cases the desired stress relief has been attained only at the expense of creating serious food pockets, in others, the freeing of the support to permit resting upon the gums has entailed undesired lateral movement, and in still others the construction has been too complicated and expensive from the standpoint of inherent structure or the manufacturing procedure required to produce it.

An object of the invention has been to produce a dental attachment of simple and rugged design providing a stress breaker which meets all of the requirements of efficiency and economy while solving the problems of the prior art as outlined above.

More specifically, the primary objection has been to provide a partial denture mounting and stress breaker attachment in which the desired freedom of movement is available without producing any looseness or unnecessary movements, or any pockets for accumulation of food.

A further object has been to provide such an attachment with a pivotal bearing formed by casting the saddle support and anchor member directly around projecting portions of a pivot hinge designed and pre-fabricated to interconnect them.

A further object has been to provide such an attachment in which the parts are so delicately interfitted as to provide ease of pivotal operation at all times.

A further object has been to provide a pivotal bar or member for such interconnection which admirably fulfills its primary function while preventing undesirable lost motion.

A further object has been to provide a system of fabrication by which these results can be attained economically and directly.

Still further objects and advantages, and the manner in which they have been attained, will be evident from reading of the following detailed description in the light of the attached drawing, in which:

FIGURE 1 is a perspective view of a dental attachment of the invention, with partial dentures secured thereto, FIGURE 2 is a plan view of the interconnected metal parts of the dental attachment, FIGURE 3 is a detailed view, partly in plan and partly in section, of the right-side portion of FIGURE 2, FIGURE 4 is a side elevation, looking outward from the line 4—4 of FIGURE 1, FIGURE 5 is a cross-section on the line 5—5 of FIGURE 3, with the saddle illustrated in broken lines, FIGURE 6 is an end view looking from the line 6—6 of FIGURE 3, FIGURE 7 is a plan view of the casting model and inserts ready for use in the mold in manufacturing the attachment of the invention, FIGURE 8 is a cross-section on the line 8—8 of FIGURE 7, FIGURE 9 is an enlarged exploded perspective view of the hinge bar and associated caps for use in the casting process, FIGURE 10 is a detailed perspective view of the anchor attachment end of the pivot bar with destructible cap and wax attachments, FIGURE 11 is a detailed plan view of a modified form of the invention, and FIGURE 12 is a side elevation of the features of FIGURE 11.

The characteristic features and advantages of the invention can best be understood if we consider first the interconnecting bar or hinge as illustrated in enlarged detail in FIGURE 9. This comprises a main bar or post portion 20 which may be of polygonal, e.g. rectangular cross-section and which has a forwardly projecting portion 21 of circular cross section extending at right angles to the major axis of the portion 20. The forwardly projecting portion 21 includes circular studs 22 projecting laterally of the forward end of the post portion 20, and the outer ends of these studs are tapered to conical shape as illustrated at 23.

Spaced protuberances 24 are formed upon the post portion 20 toward its opposite end from the studs 22. In use of this bar or hinge in the invention, its rear end is securely locked through projections 24 against movement relative to the denture parts which it supports, while its front end is pivotally secured within a bearing seat formed in the anchor member such as the clasp 28 by which the denture is secured to an abutment tooth. As illustrated in FIGURE 5, the metallic supporting plate 25 for the denture saddle is cast about the rear end 26 of the bar, while an extension 27 of clasp 28 is cast about its forward end under special conditions providing the desired pivotal connection.

In FIGURES 7 and 8 of the drawing I have illustrated the use of the hinge bar as a part in manufacture of the dental attachment illustrated in FIGURES 2 and 3. FIGURE 2 illustrates a lingual bar 29 having clasp members 28 at its opposite ends for securement to abutment teeth and open-mesh metallic saddle plates 25 for support of partial dentures secured pivotally to the lower rear edges of the respective clasps through hinge bars 20. Since the hinge connections and other features are similar for both of the partial dentures illustrated, we need to consider in detail only the right side as illustrated in FIGURES 3–6.

As illustrated in FIGURE 7, wax is applied to the casting model 32 to provide the necessary sprues 33, the shapes 34 and 35 for the lingual bar and clasps, and the shapes 36 for the metallic saddle supports.

A wax layer 37 (FIGURES 8 and 10) is also formed as an extension of the wax clasp form 35 about a substantial part of the circumference of the central part of the extension 21, and rigid cap members 38 are applied, in closely-fitted relationship, upon the outer ends of the laterally-projecting studs 22 and against the edges of the wax layer 37. The caps 38, while rigid enough to withstand stresses incident to their application and use in the investment casting process, are formed of material which is destroyed by heat applied in that process. They may, for example, be formed of polystyrene or other heat-destructible synthetic resin.

The hinge bars 20 are applied to the casting model in position between the wax forms 35 and 36 of the anchor members and the saddle-supporting members, in the same relationship that they are to occupy relative to the metal anchor and saddle members when cast, the forward extension 21 being embedded within the wax extension 37 of the clasp adjacent the lower rear edge of the model of the associated anchor tooth, and the rear end being embedded within a forward protuberance 39 of the wax form 36. Since the caps 38 cover the ends of the studs 22, these caps, together with the applied wax, provide a covering corresponding to the desired shapes of lingual bar, clasps and metallic saddle supports in exactly the relationship these parts will occupy to each other in the mouth of the wearer.

The casting model 32, with the wax and hinge bar additions, is now placed in a mold and covered with the desired refractory investment plaster, and the wax and plastic inserts are removed or destroyed by heat or in other known manner to provide sprue and mold spaces associated with the model to receive molten metal to form the desired saddle supports and anchor, with interconnecting hinge bars as illustrated. After removal of the mold model and the sprue metal extensions, there will remain the lingual bar 29, clasps 28 and metallic saddle supports 36 pivotally interconnected with the clasps through bars 20 at 27.

The rear edges of the anchorages formed by the lingual bar and clasps are provided with laterally and downwardly extending faces 42 which serve as limiting abutments to prevent excessive downward movement of the saddle carrying the artificial teeth. After formation of the interconnected metallic attachment members as discussed above, saddle members 43 are molded or formed about the metallic plates or supports 25 as supports for the artificial teeth. These saddles may be formed of a thermoplastic material, such as the familiar dental acrylic resin, and they may fill the spaces between clasps and saddle supports when originally formed, as illustrated in broken lines in FIGURE 4.

The metallic hinge connections, which are permitted when originally formed to pivot through the substantial arc provided between the ends of the arcuately cast metal as indicated by the wax pattern 37 of FIGURE 8, are immobilized when the acrylic resin is formed to provide saddle members with their forward edges projecting into contact with faces 42, as illustrated at 45 in FIGURE 5.

The portion of the clasp or lingual bar lying adjacent to this area 45 is heated after the saddle is formed, however, and the saddle is pressed downwardly about the pivotal connection at 27 to soften the thermoplastic saddle material and thereby permit it to yield to provide a limited amount of free play between the horizontal position illustrated in FIGURE 5 and the position illustrated by the broken line 46. In subsequent use of the denture, there will therefore be permitted the slight amount of free angular play of the saddle about a horizontal axis necessary to permit accommodation to the gums of the wearer, and to permit the major part of the stress incident to mastication to be absorbed by the gums rather than by the abutment tooth.

Particular attention is called to the fact that by providing relatively rigid, but destructible, caps 38 over the projecting studs 22 of the bar 20, there are formed in the ensuing casting operation bearing seats for these studs 22 which are accurately formed to circular shape, and which therefore permit free rotation of these studs within the bearing seats within the limits imposed by the metal cast about the central portion of the extension 21. This metal imposes abutments against upward movement of the bar 20 above the horizontal position illustrated in FIGURE 8 or below the lower limiting position corresponding to the edge 47 of that FIGURE.

By the employment of this investment and casting technique, it is possible to provide a hinge connection in which there are no pockets available for food accumulation, and in which the projecting studs 22 with their extended conical outer faces 23 serve as widely spaced lateral projections mounted accurately within corresponding bearing seats of the surrounding casting to prevent lateral free play of the denture. As these bearings are formed about the studs themselves, in an extension of the anchor member, these studs may be mounted for rotation about an axis in close proximity to the base of the anchor tooth, with the result that a compact combination is provided without the necessity of such free play as would entail food pockets.

In the modification of FIGURES 11 and 12, there is illustrated a slightly different arrangement in which the pivoted interconnecting bar between the anchor 50 and the saddle 51 is in the form of a wire bent into U-shape as illustrated at 52. This wire has a laterally extending portion 53 mounted within a bearing seat 54 of a projection on the clasp adjacent the base position of the abutment tooth. In manufacture of the attachment of FIGURES 11 and 12, the clasp and lingual bar illustrated at 50 may be formed in wax against the casting model with a core of nickel extending through the wax insert to provide the opening which ultimately forms the bearing for the laterally extending portion 53 of the bar 52. After the clasp and lingual bar are formed by the investment or lost wax process about this nickel insert, the insert may then be burned out with nitric acid or the like, and the wire member threaded through the resulting bearing opening. The wire member is then bent to the shape illustrated at 52 in FIGURE 11, the ends of the wire being brought together and secured as illustrated at 55. The acrylic resin cap and artificial teeth may thereafter be formed about the bar 52 directly, and the resulting saddle with attached teeth may be freed for a desired degree of pivotal movement in the same manner discussed above in connection with FIGURE 5 of the embodiment of the invention illustrated in FIGURES 1 to 10. In this form of the invention the acrylic resin serves directly as the saddle plate for support of the artificial teeth.

From the foregoing discussion, it will be evident that I have provided a dental attachment which accomplishes all of the objects set forth in the introductory portion of this specification. While it has been necessary in the interest of clarity to limit the discussion of the invention to preferred features applicable to only two specific embodiments, persons skilled in the art will be aware that this invention may be refined and modified in many ways without departing from the basic principle thereof. I therefore wish it to be understood that the invention is not to be limited in interpretation except by the scope of the following claims.

I claim:

1. A denture comprising a plate providing a support for artificial teeth, an anchor member for attachment to a natural tooth to secure said plate thereto, and an interconnecting bar having one end embedded within said plate and pivotally interconnected with said anchor member in close proximity to the tooth-base attaching portion thereof, said pivotal interconnection including laterally projecting circular studs upon said bar mounted for rotation about a horizontal axis within circular bearing seats within an extension of said anchor member, said pivotal interconnection being entirely confined and enclosed in said extension and a saddle member secured to said plate and having an end portion with a face extending substantially into abutment with a complementary downwardly extending face of said anchor member but providing a slight amount of pivotal free play between said complementary faces.

2. In the manufacture of dental attachments, the method comprising fabricating a pivotal bar, embedding an end of said bar in a disposable molded body formed to the shape of a desired tooth-supporting plate, embedding laterally-projecting circular studs at the opposite end of said bar within a second disposable body formed to the shape of a desired anchor member, said disposable body including cap portions of rigid heat destructible material surrounding said circular projecting studs, embedding the resulting composite member in investment casting material within a mold, removing said disposable molded body materials and said cap portions to provide mold cavities surrounding portions of said bar, and casting material within said cavities for securement at opposite ends of said bar to produce completely encased plate and anchor attachments thereto.

3. In the manufacture of dental attachments, the method comprising fabricating a pivotal bar, embedding an end of said bar in a disposable molded body formed to the shape of a desired tooth-supporting plate, embedding laterally-projecting circular studs at the opposite end of said bar within a second disposable body formed to the shape of a desired anchor member, said disposable body including cap portions of rigid heat destructible synthetic resin material surrounding said circular projecting studs, embedding the resulting composite member in investment casting material within a mold, removing said disposable molded body materials and said cap portions to provide mold cavities surrounding portions of said bar, and casting material within said cavities for securement at opposite ends of said bar to produce completely encased plate and anchor attachments thereto.

4. In the manufacture of dental attachments, the method comprising fabricating a pivotal bar, embedding an end of said bar in a disposable molded body formed to the shape of a desired tooth-supporting plate, embedding laterally-projecting circular studs at the opposite end of said bar within a second disposable body formed to the shape of a desired anchor member, embedding the resulting composite member in investment casting material within a mold, removing said disposable molded body materials to provide mold cavities surrounding portions of said bar, and casting material within said cavities for securement at opposite ends of said bar to produce the plate and anchor attachments thereto, and molding a denture saddle in thermoplastic material upon said plate and in adjacency to a downwardly projecting face of said anchor member, softening the portion of said saddle adjacent said face and molding said softened portion to provide clearance to permit limited relative rotary movement between said saddle and said anchor member.

5. In the manufacture of dental attachments, the method comprising fabricating a pivotal bar, embedding an end of said bar in a disposable molded body formed to the shape of a desired tooth-supporting plate, embedding a circular arcuate end portion at the opposite end of said bar within a second disposable body formed to the shape of a desired anchor member through a substantial portion of said arcuate extent while leaving another portion of said arcuate extent unembedded, embedding the resulting composite member in investment casting material within a mold, removing said disposable molded body materials to provide mold cavities surrounding portions of said bar, and casting material within said cavities for securement at opposite ends of said bar to produce encased plate and anchor attachments thereto.

6. In the manufacture of dental attachments, the method comprising fabricating a pivotal bar, embedding an end of said bar in a disposable molded body formed to the shape of a desired tooth-supporting plate, embedding a circular arcuate end portion at the opposite end of said bar within a second disposable body formed to the shape of a desired anchor member through a substantial portion of said arcuate extent while leaving another portion of said arcuate extent unembedded, also embedding laterally extending circular stud portions at said opposite end of said bar within a disposable body formed of heat destructible rigid material, embedding the resulting composite member in investment casting material within a mold, removing said disposable molded body materials to provide mold cavities surrounding portions of said bar, and casting material within said cavities for securement at opposite ends of said bar to produce encased plate and anchor attachments thereto.

References Cited in the file of this patent

UNITED STATES PATENTS

| 1,438,167 | Brown | Dec. 12, 1922 |
| 1,480,549 | Emerson | Jan. 15, 1924 |
| 2,196,505 | Morton | Apr. 9, 1940 |
| 2,797,482 | Zahn | July 2, 1957 |

OTHER REFERENCES

Brown, A. I.: "The Movable Fixed Bridge," Dental Cosmos, July 1929, pages 667-669 (see p. 667).